July 12, 1966  T. ONGARO ETAL  3,260,101
CALIBRATION METHOD
Filed Sept. 4, 1962
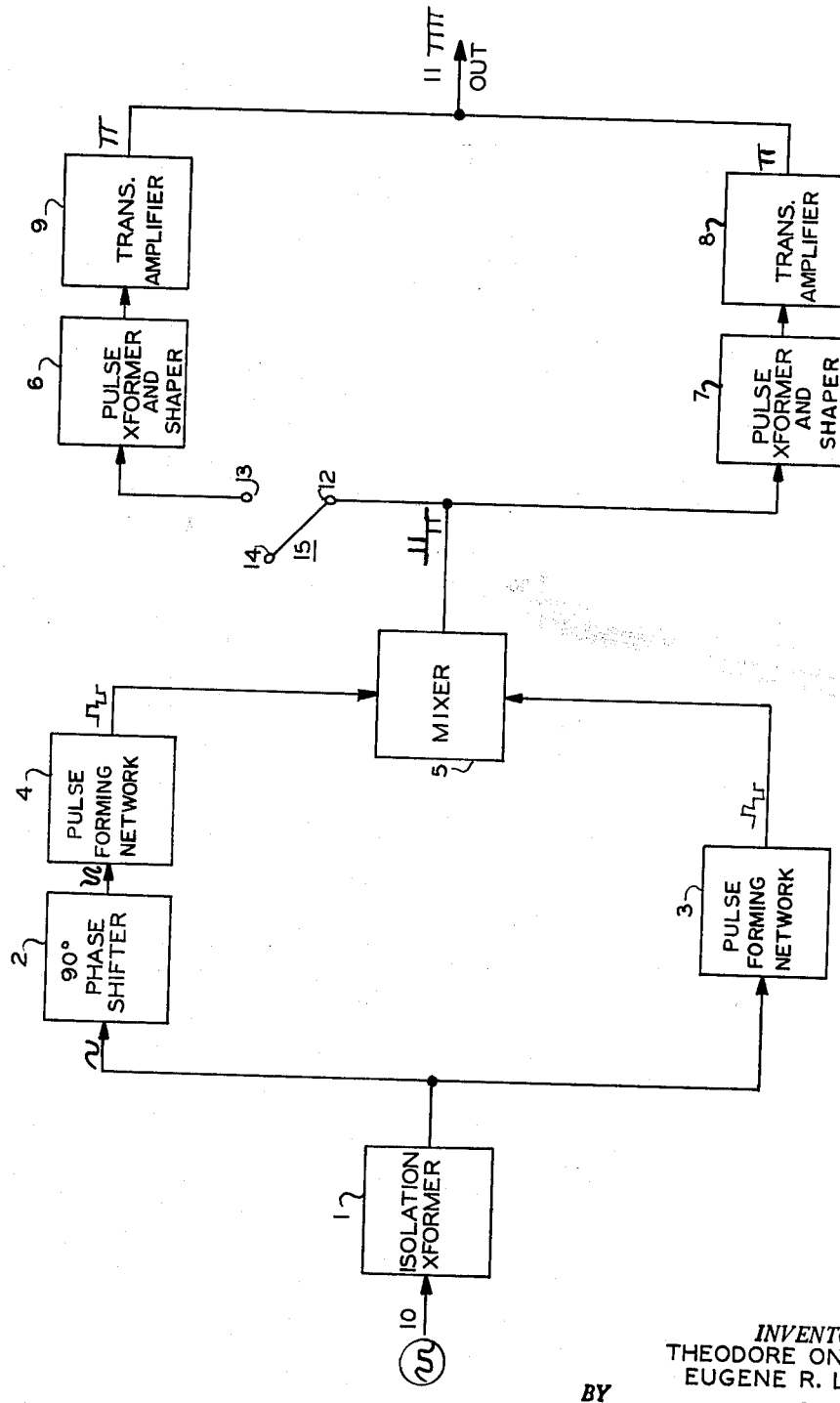
INVENTORS
THEODORE ONGARO
EUGENE R. LUCKA
BY
Anthony W. Cunnamo
ATTORNEY

United States Patent Office 3,260,101
Patented July 12, 1966

3,260,101
CALIBRATION METHOD
Theodore Ongaro and Eugene R. Lucka, Columbus, Ohio, assignors to Ongaro Dynamic Industries, Inc., a corporation of Ohio
Filed Sept. 4, 1962, Ser. No. 221,158
3 Claims. (Cl. 73—1)

This invention relates generally to instruments for the measurement of events in a unit of time and specifically to the method and means of calibrating an instrument operable to measure events occurring in a unit of time.

The prior art is replete with instruments designed for measuring the cadence, rate of occurrence, repetition, and revolutions per minute of a train of pulses or events in a unit of time having uniform spacing from one another. The most generic term applicable to these general types of instruments is the tachometer. Examples of the uses of tachometers may be wind velocity, heart-beat of a person, impacts of a rotating wheel, and the throb of an engine. The present invention has particular reference to those tachometers that measure the throb of an engine—the r.p.m.

There are tachometers commercially available in various designs, mechanical and electrical that are quite accurate. The accuracy is, of course, dependent upon the care in its production and the calibration procedure at the factory. Unfortunately, the degree of accuracy becomes doubtful with usage, and with extended usage, the instrument cannot be considered calibrated and consequently its reliability has diminished. Even in those instances where the tachometer has not lost its calibration after extended usage, its accuracy will not be known and will be questioned. In order to restore the accuracy of the instrument or to eliminate doubt, the instrument must be removed from its operation and returned to the factory for recalibration. With the inexpensive type of instrument, it may be just as economical to purchase another. In any event, the recalibration procedure causes down time and is, comparatively speaking, extremely expensive.

In order to avoid the disadvantages of the prior art instruments, the present invention provides method and means for accurately checking the calibration of a tachometer designed for the measurement of events occurring in a unit of time. Of most significance, the method of the present invention does not require that the tachometer be removed from either its operation or other environment. The calibration is extremely simple and instantaneous.

More specifically, the present invention provides an accurate standard signal for checking the calibration of the tachometer. The standard signal has as its reliability the 60 cycle frequency obtainable from any utility line. The 60 cycle alternating current signal is converted into pulses of many multiples and then fed to the tachometer in its own environment. The multiples being dependent upon the range of measurement of the tachometer.

It is accordingly a principal object of the present invention to provide a method and means for checking the calibration of an instrument designed to measure events occurring per unit of time.

It is a further object of the present invention to provide a calibration check for a tachometer that is exact, extremely simple and relatively inexpensive to perform.

Another object of the present invention is to provide a calibration check for a tachometer that may be made without removing the instrument from its operational environment.

Other objects and features of the invention will become apparent from the following detailed description when taken in conjunction with the single figure drawing illustrating a simple block diagram in schematic of an electronic circuit utilized in carrying out the method of the invention.

Referring now to the drawing, the preferred electronic embodiment is generally operable to convert a standard 60 cycle signal to sharp pulses at a much higher multiple rate. The pulse repetition rate at the output will correspond to those repetition rates most commonly encountered in the operational environment of the tachometer. More specifically, source 10 represents a standard source of 60 cycle such as found in any utility outlet. The 60 cycle signal is passed through isolation transformer 1, whose function is as a power line transformer to isolate shock hazard. The output of the isolation transformer is fed to the first of a two-channel circuit. Essentially, the two-channel circuits convert the sine wave into pulses and perform an additive function increasing the pulse repetition rate over that of 60 cycles. In this operation the 60 cycle signal is clipped and shaped in clipper 3 and then fed to mixer 5. The 60 cycle signal is also fed to the 90° phase shifter circuit 2 and then clipped and shaped in the clipper 4. The output pulses from clipper 4 are also fed to the mixer 5 where they are mixed and combined with the output pulses from the clipper 3. The purpose of the 90° phase shift is to increase the number of output pulses at the mixer 5 by a multiple of 4, i.e., 240 pulses per second. The output at the mixer 5 will be a series of pulses in the general nature of a spike though not relatively sharp. Half of these pulses will be positive and the other half negative.

The pulse transformers 6 and 8 are designed to further shape the output pulses from the mixer 5. That is, the resulting pulses from these circuits are sharp pulses. Since it is desired that all the output pulses have a like polarity, pulse transformer 6 also acts as a phase inverter to convert the positive pulses to negative pulses. The transistor amplifiers 8 and 9 simply serve to amplify the pulses.

In order that the number of output pulses may be varied to more closely correspond to the tachometer operation, a switch 15 is provided. When the switch arm 12 is closed with contact 13, both the positive and negative pulses from the mixer are passed to the respective pulse transformer. In this state there results at the output 11, 240 sharp pulses. If it is desired to half the number of pulses at the output 11, this is simply done by opening the switch 15 by moving arm 12 to the open contact 14. The 240 pulses per second is chosen since it corresponds to the revolutions per minute of six cylinder automobile engine (4800 r.p.m.) and to the eight cylinder automobile engine (3600 r.p.m.). In the open position of switch 15, the 120 pulses per second will correspond to the revolutions per minute of the four cylinder engine (3600 r.p.m.).

A standard type of tachometer designed for the conventional automobile engine is operable on a pulse input basis. That is, each revolution of the engine is converted into a pulse. The pulses are detected and read out on a pulset rate meter. The accuracy of the read-out meter, after it leaves the factory, is no longer known and always questioned. To check the accuracy of the read-out meter—the tachometer—in accordance with the invention, pulses generated from a 60 cycle standard source are applied directly to the tachometer. The unvarying accuracy of the utility 60 cycle source of alternating current has long been established, and consequently, the accuracy of the output pulses in repetition rate cannot be questioned. The pulses from the calibration source are applied to the tachometer in a manner exactly as that employed in its normal operation. One such application comprises a pickup coil looped around the ignition wire and having a connection therefrom directly to the tachometer.

Although the pulse former with reference to the block diagram is all electrical, the same results may alternatively be obtained with a system partly mechanical. One typical alternative system would include using an electrical synchronous motor. On the shaft of the motor there may be inserted a disc that is provided with equally-spaced circles of slits—but each circle having a different number of slits. To complete the arrangement, a light source is disposed on one side of the shaft and a photocell on the other side. By mechanically shifting the position of the synchronous motor so that a different circle can be in focus with the light and photocell, a pulse is formed from the interrupted signal. In this manner a tachometer can be similarly checked and adjusted to the exact value as derived from the A.C. 60 cycle synchronous running system.

In a like manner, in still another alternative embodiment, the same synchronous motor system can be equipped with a cam cluster. The cams in turn make contact with a set of interrupter points, thus, again providing fixed pulses which can be adapted to check for a precise adjustment, electrical tachometers.

It is seen from the foregoing that a pulse signal can be derived as a multiple or sub-multiple of the A.C. 60 cycles; and that by feeding this pulse to an electrical tachometer, exact checks and adjustments can be made. The reliability of the checking signal will assure a reference which an electrical tachometer can be checked and brought up to standard in every area where needed.

In the above-described embodiment, reference is made to the standard utility 69 cycle alternating current. It is to be understood that in some instances—and primarily foreign countries—the standard utility alternating voltage has a different frequency, for instance 50 cycles. Further, in most Government installations, a 400 cycle alternating source is considered as a standard utility signal. It will be apparent to those skilled in the art that the invention encompasses standard utility alternating current sources having a different frequency than 60 cycle.

Although certain and specific embodiments have been shown or described, it is to be understood that modifications may be made thereto without departing from the spirit and scope of the invention.

What is claimed is:

1. In combination a tachometer for indicating the number of events occurring in a unit of time comprising means for detecting said events, means for converting each event into an electrical pulse, means for averaging the current of said pulses, means for converting said current into an indication of the frequency of occurrence of said pulses, and means for varying said indication; a calibration instrument for determining the accuracy of said tachometer comprising a standard alternating signal source, means for converting the signal from said source to a train of pulses with a repetition rate that is a multiple of the frequency of said signal; said last named means including a constant alternating signal source, means for converting said alternating signal into a positive and negative pulse for each cycle, means for doubling said pulses, means for combining said pulses, and means for inverting said positive and negative pulses to pulses of like polarity; means for disconnecting said events to said detecting means and for connecting said standard frequency calibration pulses to said detecting means, and means for correlating said tachometer frequency indication with the pulse repetition frequency of said standard calibration pulses.

2. In combination a tachometer for indicating the number of events occurring in a unit of time comprising means for detecting said events, means for converting each event into an electrical pulse, means for averaging the current of said pulses, means for converting said current into an indication of the frequency of occurrence of said pulses, and means for varying said indication; a calibration instrument for determining the accuracy of said tachometer comprising, a constant alternating signal source, means for converting said signal into a positive and negative pulse for each cycle, means for doubling said pulses, means for combining said pulses and means for inverting said positive or negative pulses to pulses of like polarity; means for disconnecting said events to said detecting means and for connecting said standard frequency calibration pulses to said detecting means, and means for correlating said tachometer frequency indication with the pulse repetition frequency of said standard calibration pulses.

3. In combination a tachometer for indicating the number of events occurring in a unit of time comprising means for detecting said events, means for converting each event into an electrical pulse, means for averaging the current of said pulses, means for converting said current into an indication of the frequency of occurrence of said pulses, and means for varying said indication; a calibration instrument for determining the accuracy of said tachometer comprising a standard alternating signal source, means for converting the signal from said source to a train of pulses with a repetition rate that is a multiple of the frequency of said signal and corresponding to said events in a unit of time; said last named means including a constant alternating signal source, means for converting said alternating signal into a positive and negative pulse for each cycle, means for doubling said pulses, means for combining said pulses, and means for inverting said positive and negative pulses to pulses of like polarity; means for disconnecting said events to said detecting means and for connecting said standard frequency calibration pulses to said detecting means, and means for correlating said tachometer frequency indication with the pulse repetition frequency of said standard calibration pulses.

References Cited by the Examiner

UNITED STATES PATENTS

| | | | |
|---|---|---|---|
| 2,830,191 | 4/1958 | McCollom et al. | 73—1 X |
| 2,887,654 | 5/1959 | Strassman et al. | 324—78 X |
| 2,987,674 | 6/1961 | Shain | 324—78 |

LOUIS R. PRINCE, *Primary Examiner.*

ISAAC LISANN, DAVID SCHONBERG, *Examiners.*

STEVEN H. BAZERMAN, *Assistant Examiner.*